United States Patent [19]

Spearman

[11] Patent Number: 5,599,448
[45] Date of Patent: *Feb. 4, 1997

[54] BOX FILTER APPARATUS

[75] Inventor: Michael R. Spearman, St. Paul, Minn.

[73] Assignee: Porous Media Corporation, St. Paul, Minn.

[ * ] Notice: The term of this patent shall not extend beyond the expiration date of Pat. No. 5,376,270.

[21] Appl. No.: 542,280

[22] Filed: Oct. 12, 1995

Related U.S. Application Data

[62] Division of Ser. No. 479,863, Jun. 7, 1995, Pat. No. 5,489,352, which is a continuation of Ser. No. 281,364, Jul. 27, 1994, abandoned, which is a continuation of Ser. No. 83,076, Jun. 24, 1993, Pat. No. 5,376,270.

[51] Int. Cl.⁶ .......................... B01D 27/06; B01D 27/08
[52] U.S. Cl. .................. 210/445; 210/446; 210/451; 210/493.2; 210/493.3; 55/497; 55/521
[58] Field of Search ........................ 210/445, 446, 210/451, 493.1, 493.2, 493.3; 55/497, 502, 511, 521

[56] References Cited

U.S. PATENT DOCUMENTS

| | | | |
|---|---|---|---|
| D. 234,721 | 4/1975 | Rosenberg | D29/7 |
| D. 235,035 | 4/1975 | Rosenberg | D24/162 |
| D. 238,456 | 1/1976 | Mouwen | D24/162 |
| D. 247,252 | 2/1978 | Rosenberg | D24/162 |
| D. 260,175 | 8/1981 | Hein et al. | D24/162 |
| D. 267,117 | 11/1982 | Rosenberg | D24/162 |
| 3,712,033 | 1/1973 | Gronholz | 210/493.1 |
| 3,765,536 | 10/1973 | Rosenberg | 210/436 |
| 3,765,537 | 10/1973 | Rosenberg | 210/446 |
| 3,815,754 | 6/1974 | Rosenberg | 210/445 |
| 3,869,392 | 3/1975 | Wolf | 210/493.1 |
| 4,014,797 | 3/1977 | Raines et al. | 210/446 |
| 4,133,661 | 1/1979 | Strnad | 55/497 |
| 4,163,721 | 8/1979 | Lobdell | 210/493.1 |
| 4,165,287 | 8/1979 | Goyne | 210/493.1 |
| 4,187,182 | 2/1980 | Rosenberg | 210/445 |
| 5,376,270 | 12/1994 | Spearman | 210/445 |

*Primary Examiner*—Robert J. Popovics
*Attorney, Agent, or Firm*—Marshall & Melhorn

[57] ABSTRACT

A disposable box filter having a housing having mating channel-shaped male and female portions defining a generally box-shaped fluid chamber, with a pair of fluid ports, and a filter element in corrugated sheet form extending across the fluid chamber. The corrugated filter has generally vertically extending pleats or extremities which are mechanically sealed at each end between a pair of vertical axially extending portions of the filter housing.

1 Claim, 3 Drawing Sheets

BOX FILTER APPARATUS

The present application is a division of U.S. patent application Ser. No. 08/479,863, filed Jun. 7, 1995, in the name of Michael R. Spearman, now U.S. Pat. No. 5,489,352 which is a continuation of U.S. patent application Ser. No. 08/281,364, filed on Jul. 27, 1994, now abandoned, in the name of Michael R. Spearman which is a continuation of U.S. patent application Ser. No. 08/083,076, filed on Jun. 24, 1993 in the name of Michael R. Spearman and entitled "BOX FILTER", now U.S. Pat. No. 5,376,270.

BACKGROUND OF THE INVENTION

1. Field of the Invention

The present invention relates to filters and filter housings. More particularly, the present invention relates to a disposable box filter useable in medical and other applications which is of low cost and capable of being made absolutely sterile before use.

2. Description of the Prior Art

Box filters, because of their unique configuration, low cost, and ease of manufacture, have been found very useful in medical applications, as well as in other applications. It is quite important in medical applications that a filter be capable of being made absolutely sterile before use. To avoid the necessity of cleaning and sterilizing operations after use, it is also desirable that the filter be disposable. For a filter to be disposable, it must necessarily be of low cost. Many attempts at making a true, low cost, disposable box filter have been found in the prior art. None of them have been entirely successful.

One such prior art patent is the U.S. Pat. No. 3,765,537. While this filter is satisfactory in use, it has significant limitations which arise during the manufacturing process. The filter sheet is held tightly between an internal wall and a top wall of the filter housing and is bonded in place. This requires an open pore filter sheet. This limits the type of filter element that can be used in the housing, and also increases the manufacturing cost.

Another such attempt in the prior art is shown in U.S. Pat. No. 3,815,754. In an attempt to eliminate the limitations imposed by having to bond through open pores of the filter sheets, this patent attempts simply to pinch the sheet between an inner wall of the housing and the ends of a pair of vertical walls. While this design eliminated the limitation on the type of filter element that could be used to obtain a sufficient seal, the resultant filter was found not suitable for use at relatively high pressure differentials.

In an attempt to solve the problems of the prior art still present after the inventions disclose in U.S. Pat. Nos. 3,765,537 and 3,815,754, the filter shown in U.S. Pat. No. 4,187,182 was developed. In this patent, the filter sheet is pinched between the edge of the inner side walls and other portions of the housing. However, this filter increases manufacturing expense by requiring the pleats of the corrugated filter element to be trimmed specially at positions midway of the height of the filter element, thus increasing greatly the manufacturing costs.

Thus, those skilled in the box filter art continued to search for a solution to the problem of providing a truly low cost disposable box filter.

SUMMARY OF THE INVENTION

To solve the problems present in the prior art, a disposable box filter is provided having a housing comprising mating, channel shaped, male and female portions defining a generally box shaped fluid chamber, with a pair of fluid ports, and a filter element in corrugated sheet form extending across the fluid chamber. The corrugated filter has generally vertically extending pleats or extremities which are mechanically sealed at each end.

In the preferred embodiment of the invention, the housing of the filter assembly comprises mating male and female portions which form a box-shaped fluid chamber defined by an upper wall having a port or inlet therein, a lower wall having a port or outlet therein, and a pair of opposed side walls connecting the upper wall and the lower wall, and forming a pair of opposed open end walls. A pleat or pleats at each end of the corrugated filter element are mechanically sealed between generally vertical wall portions of the filter housing, one of which has been deformed and pressed in the direction of the filter paper by riding a ramp portion of the filter housing while the filter is being ultrasonically welded.

In the preferred embodiment illustrated, the disposable filter assembly is a rectangular box and substantially square sided. However, any type of box-like shape can be used. It is important to note that in the present invention, in contrast to prior art box filters, the pleat or pleats of the corrugated filter are sealed in a vertical orientation, and do not need to be bent or trimmed in a horizontal orientation, as in the prior art.

Thus, one of the objects of the present invention is to provide a disposable box filter capable of being made absolutely sterile before use.

A further object of the present invention is to provide a box filter which can be mass-produced at low cost.

A still further object of the present invention is to provide a box filter having a corrugated filter element which is sealed in the box filter housing with the pleat or pleats of the corrugated filter remaining in a generally vertical orientation.

A still further object of the present invention is to provide for a disposable box filter usable at high pressure differentials.

Further objects and advantages of this invention will be apparent from the following description and appended claims, reference being made to the accompanying drawings forming a part of the specification, wherein like reference characters designate corresponding parts in the several views.

Figure 1:
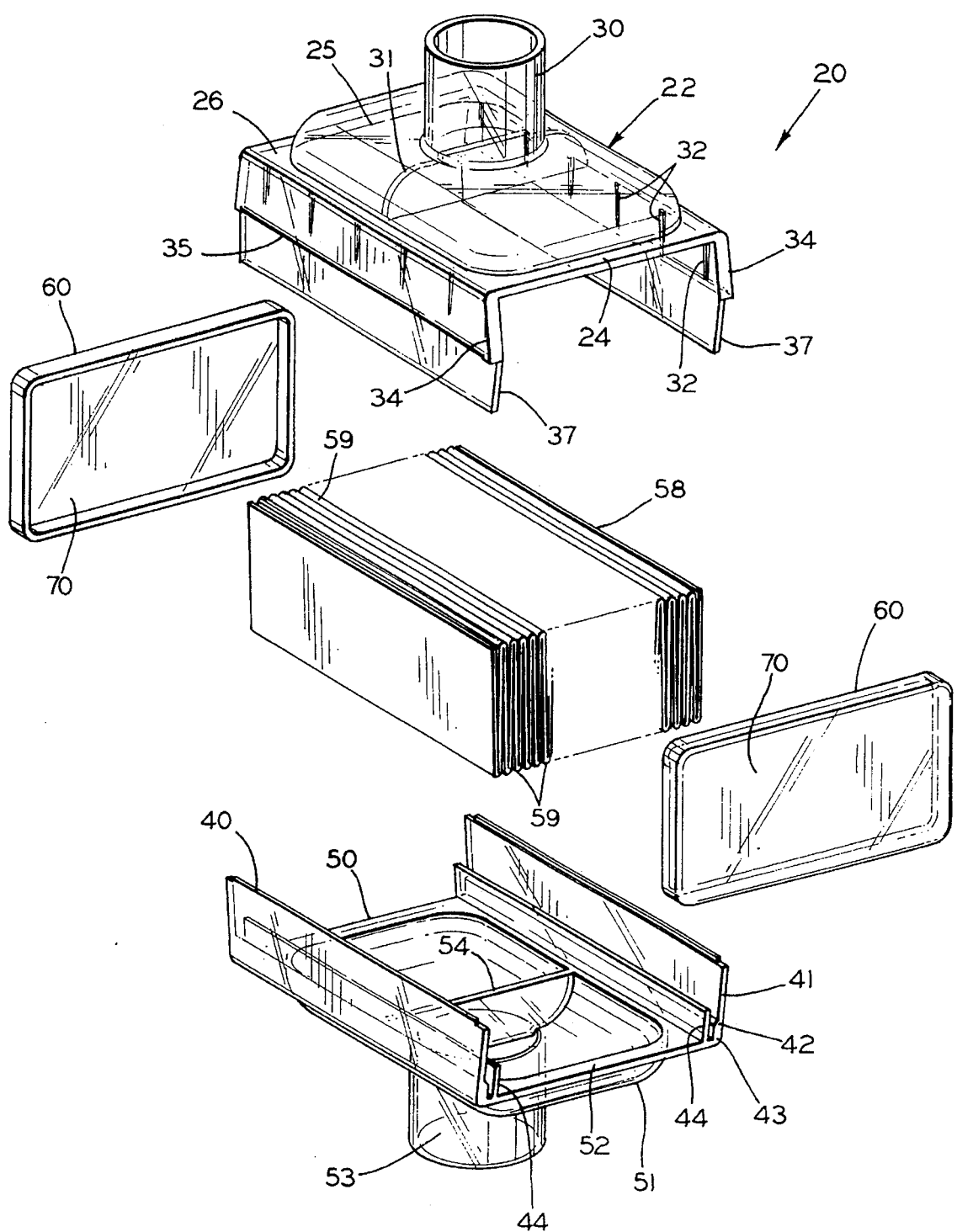
FIG. 1 is an exploded perspective view of a construction embodying the present invention.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

The disposable filter assembly shown in FIGS. 1–5 is generally designated by the numeral 20. The filter assembly 20 includes a molded plastic housing, generally designated by the numeral 21 (FIGS. 2 and 4), and including a male portion 22 and a female portion 23. The upper or male housing portion 22 includes an upper plenum wall 24. The upper plenum wall 24 includes a plenum 25, a rim 26, an upper port or inlet 30, and an upper rib 31.

Since the disposable box filter assembly 20 is reversible, it can easily be understood by those skilled in the art that the upper port 30 can serve as an inlet or outlet, and thus that these terms may be used interchangeably.

Also found on the male housing portion 22 are a plurality of reinforcing ribs 32, and a pair of opposed downwardly depending side walls 34 having a grooved portion 35, an ultrasonic energy ridge or portion 36, and a tapered or wedge-shaped portion or wall 37.

The lower or female portion 23 of the plastic housing 21 includes a tongue portion 40, a first wall portion or first portion 41, a ramp portion 42, and a second portion or second wall portion 43, which is of greater thickness than the first portion 41. Also found on the lower or female portion 23 is a lower plenum wall 50 including a lower plenum 51, a lower rim 52, a lower port or inlet 53 and a lower ridge 54.

The plastic housing 21 may be made of any practical transparent, opaque, or solid material. For most applications of the disposable box filter assembly 20, it is believed that a transparent plastic housing 21 will be preferred. Depending on the particular application, the housing may be made from many materials. A preferred material is K-Resin (KROI Grade). The housing may also be made from ABS, styrene, polycarbonate, nylon, polyester, or other thermoplastic materials.

Figure 2:
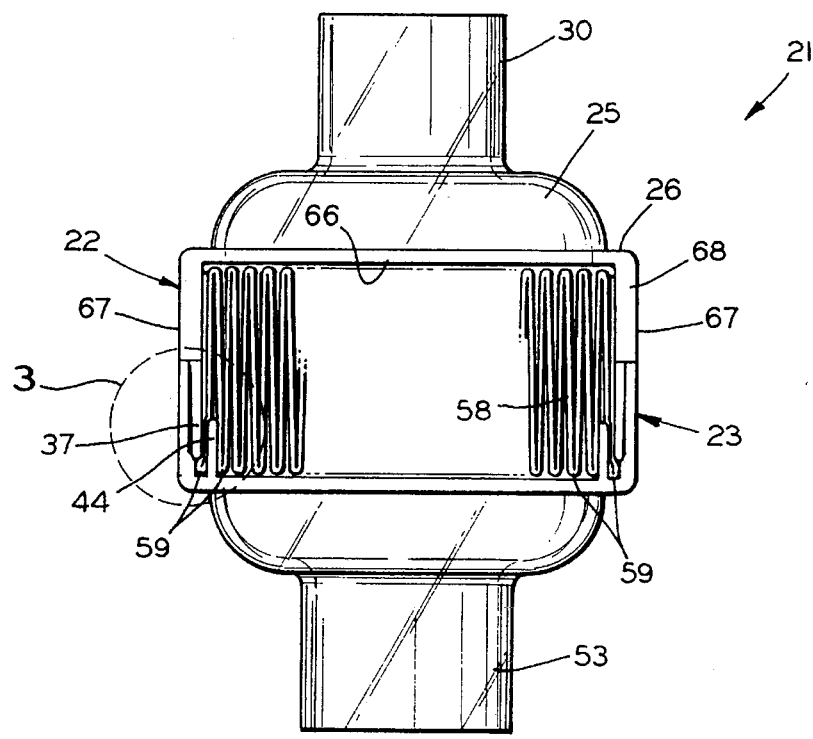
FIG. 2 is an end view of the construction shown in FIG. 1 after assembly, but before the end caps are potted in place.

Referring to FIG. 2, there is shown the plastic housing 21 having the male or upper housing portion 22 completely assembled and ultrasonically welded to the lower or female housing portion 23, and containing a corrugated filter 58. The plastic housing 21 assembled to this stage of manufacture shows the almost completed disposable filter assembly 20 before the end caps 60 are potted on. The corrugated filter 58 is has a predetermined number of pleats 59. The number of pleats required will depend on the particular application. Also, depending on the particular application, is the selection of the material for the corrugated filter 58. Widely used filter media are such as glass fiber and polypropylene, which can have a thickness in the range of 0.013" to 0.022". A typical thickness range is from 0.015" to 0.016".

Figure 3:
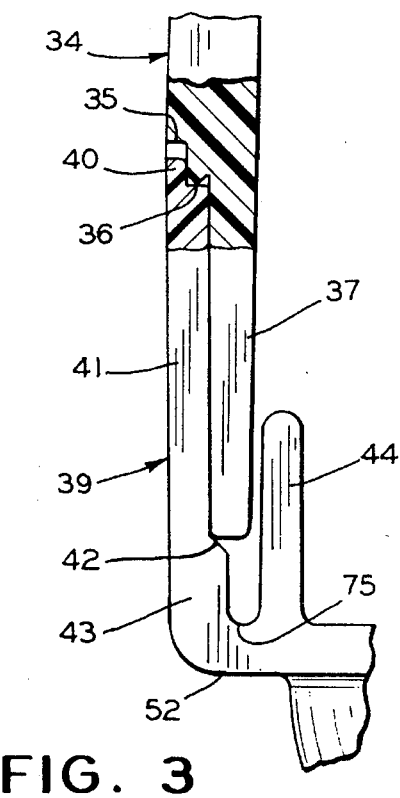
FIG. 3 is an enlarged view of the indicated portion of the construction of FIG. 2.
Figure 3A:
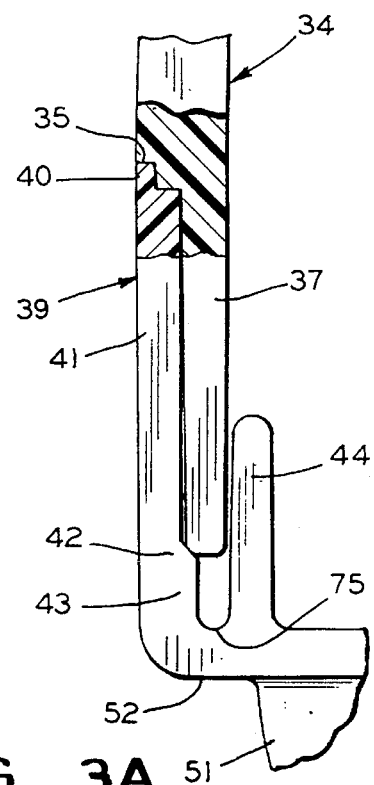
FIG. 3A is a view similar to FIG. 3, but showing the mating housing portions before ultrasonic welding.

The novel sealing means of the present invention is best shown in FIGS. 2–3A. As hereinbefore discussed, the prior art box filters required the sealing of the filter media to be done in a generally horizontal plane trapped between what may generally be called a top wall and a side wall of the filter. In some cases, the paper was even bonded to the filter housing to get a proper seal. All of these types of housings or sealing arrangements cause various problems in the art.

The box filter of the present invention is the first box filter to eliminate these problems by sealing the filter media in a generally vertical orientation. It can be seen in FIG. 2 that one pleat 59 of the corrugated filter 58 is trapped between the tapered portion 37 of the downwardly depending side wall 34 forming a portion of the male housing 22, and the upstanding ridge 44 forming a portion of the lower or female housing portion 23.

By designing the plastic housing 21 with the ultrasonic manufacturing process in mind, a unique and novel way of providing sufficient force on the pleat is provided such that a purely mechanical seal may be attained between the filter 58 and the housing 21 without any cutting or special bending or treatment of the filter media.

An enlargement of a portion of the male and female housings are shown in FIG. 3 and 3A to illustrate this. As shown in FIG. 3, when the male housing portion 22 is inserted into the female portion 23, the tongue 40 of the female housing 23 will enter the grooved portion 35 of the male housing 22 permitting the ultrasonic ridge 36 to come in contact with the first portion 41 of the upstanding wall 39. The dimensions are so selected that when the ultrasonic ridge 36 touches first wall portion 41, the lower extremity of the wedge-shaped or tapered portion of the downwardly depending side wall is in close proximity or touching the ramp portion 42.

As shown in FIG. 3A, as the ultrasonic welding manufacturing process is applied to the male and female housing portions 22, 23, the ultrasonic energy ridge 36 is progressively melted until the tongue 40 reaches proximate the bottom of the groove 35, and the housing portions have moved closer together. A typical dimension for the ultrasonic energy ridge is 0.018", but other dimensions may be chosen, depending on the application. This amount of movement causes the wedge-shaped portion 37 of the downwardly depending wall 34 to attempt to move down the ramp portion 42 toward the U-shaped channel 75, separating second portion 42 and upstanding ridge 44.

A preferred embodiment is to have the ramp 42 form an angle of 60° with the horizontal. Other angles may be used if desired.

As tapered portion 37 moves down the ramp portion 42, it is forced in a lateral direction toward the upstanding ridge 44 of the female housing portion. FIG. 3A shows this movement without the corrugated filter installed for ease of understanding. As illustrated in FIG. 2, the filter pleats 59 are compressed to about one-half their thickness, which is sufficient to compress the media to obtain a fluid-tight seal. For a media in the typical 0.015" to 0.016" range, it is preferred to compress the media to one-half to one-third of that thickness. For other media, different amounts of compression may be needed.

Figure 5:
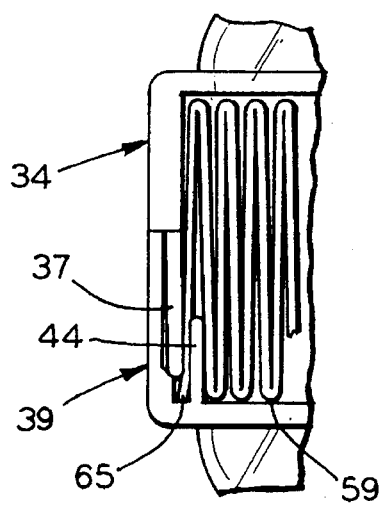
FIG. 5 is a fragmentary view, similar in part to FIG. 2, but showing a modification of the present invention where only a single thickness of the corrugated filter is "pinched" between vertical wall portions of the filter housing.

The versatility of the box filter of the present invention is shown by referring to FIG. 5. In contrast to the embodiment shown in FIG. 2, wherein an entire pleat 29 is compressed between the ridge 44 and the wedge-shaped or tapered wall portion 37, a single thickness of filter paper or media, indicated by the numeral 65, is compressed between the ridge 44 and the tapered wall 37.

Depending on the media and its compressibility, many types of media may be accommodated in a single filter housing just by reversing how the filter 58 is inserted. The modification of the invention as shown in FIG. 5 is particularly applicable to filter medias which compress very little. The ability to simply reverse the position of insertion of the filter 58 in the housing 21 permits many of these media to be used in the filter housing of the present invention without any modification.

The tapered portion 37 may have vertical side walls or tapered side walls and still be within the scope of the present invention. However, it has been found that a 5° taper, which is the preferred draft for the molding process, produces very satisfactory results.

Figure 4:
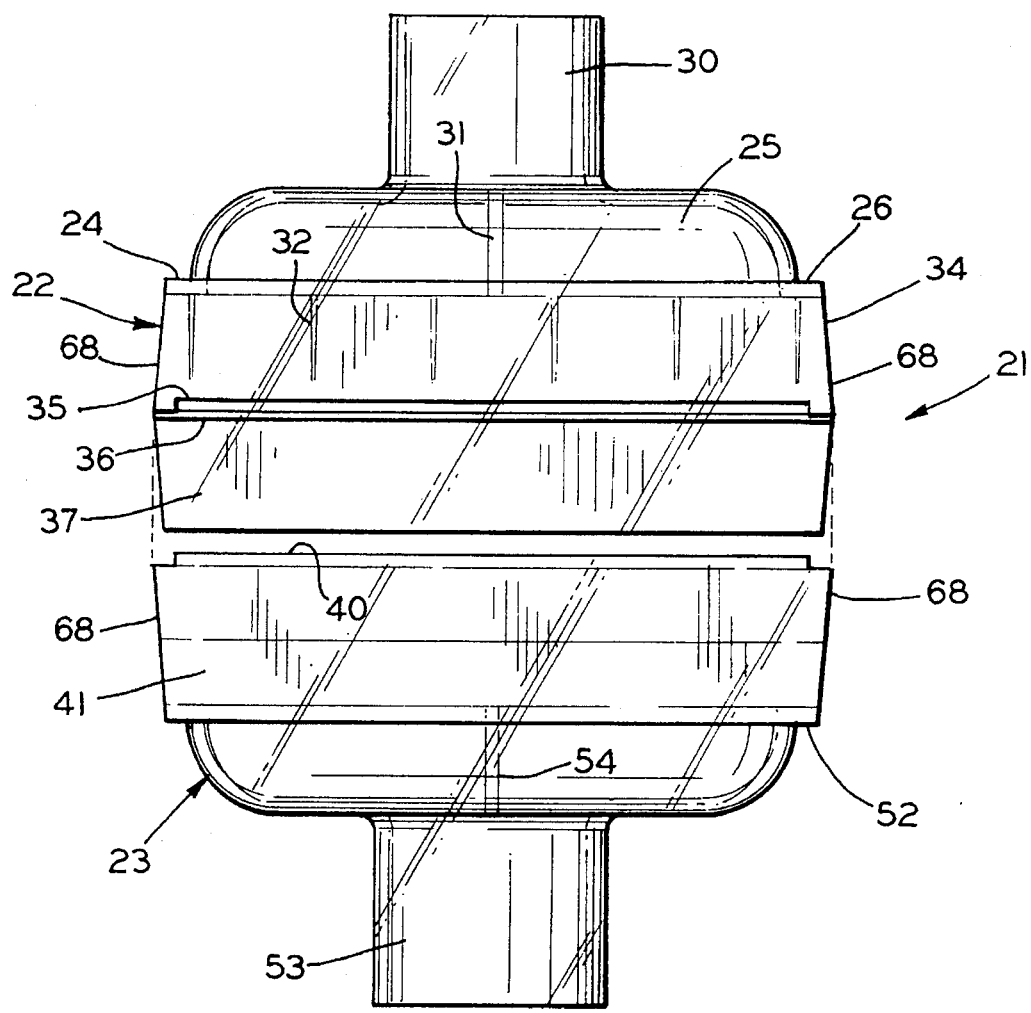
FIG. 4 is an exploded elevational view of the male and female housing portions of the construction shown in FIG. 3.

Referring to FIGS. 2 and 4, it can be seen that when the male housing portion 22 and the female housing portion 23, which are generally channel shaped in nature, are assembled, there is formed a generally box-shaped or rectangular chamber 66. The shape of the filter chamber 66 is defined by the upper plenum wall 24, the lower plenum wall 50, and a pair of opposed side walls 67, each of which is formed by a portion of the male housing 22 and the female housing 23. Also formed by assembly of the housing is a pair of open opposed end walls 68. To complete the assembly of the disposable filter assembly 20, end caps 60 are potted on to the opposed end walls 68 with potting compounds well known in the art. The particular compound used will depend upon the filter application. Potting compound is applied to the end walls 68, as well as to the rectangular wall portions 70 of the end caps 60. When the end cap 60 is then applied, the end cap is sealed not only to the opposed end wall 68 to close the chamber 65, but to the ends of the filter 58 in a fluid-tight manner, thereby forcing air to flow directly from upper port 30 through the corrugated filter 58 and exit lower port 53. The upper ridge 31 and the lower ridge 54 add strength to the corrugated filter 58, and prevents its distortion.

It can be readily understood by one skilled in the art that as long as the vertical sealing means of the present invention is maintained, the actual shape of the housing can vary substantially.

Thus, by analyzing the problems present in the art wherein the filter media of the corrugated filter used in the box filter assemblies was being sealed in generally a horizontal direction, and deciding instead to seal it in a vertical direction, and designing a housing to seal the same, while at the same time, utilizing the attributes of the ultrasonic welding process, a novel method and apparatus of providing a box filter is provided.

What is claimed is:

1. A disposable filter assembly including:

a) a housing comprising mating channel-shaped male and female portions, the mating male and female portions forming a box-shaped fluid chamber defined by an upper plenum wall having an inlet therein, a lower plenum wall having an outlet therein, a pair of opposed side walls connecting the upper plenum wall and the lower plenum wall, and a pair of opposed, open, end walls, each of said pair of opposed side walls including a generally vertical wall portion of an upper housing portion and an upstanding ridge of a lower housing portion along substantially the entire length of said side walls, the generally vertical wall portion of the upper housing portion having moved laterally inwardly toward the upstanding ridge, and away from a generally vertical wall portion of the lower housing portion as a result of an ultrasonic welding process being used to bond the upper housing portion to the lower housing portion, b) a corrugated filter element extending across said box-shaped fluid chamber, from one of the opposed side walls to the other, and across a line of fluid flow between the inlet and the outlet, a pleat at each end of said corrugated filter element mechanically held in a fluid-tight seal in a generally vertical position, between said generally vertical wall portions of the upper housing portion and the upstanding ridge portions of the lower housing portions, said filter element held in position by lateral forces applied by said generally vertical wall portions and said upstanding ridge portions, and c) end caps closing said opposed end walls and sealing said filter element to said end caps.

* * * * *